United States Patent [19]
Cobb, Jr. et al.

[11] Patent Number: 5,919,551
[45] Date of Patent: Jul. 6, 1999

[54] VARIABLE PITCH STRUCTURED OPTICAL FILM

[75] Inventors: Sanford Cobb, Jr., St. Mary's Point, Minn.; Mark E. Gardiner, Santa Rosa, Calif.; Keith M. Kotchick, Woodbury, Minn.; Kazuhiko Toyooka, Yamagata, Japan; William A. Hibbard, Woodbury, Minn.

[73] Assignee: 3M Innovative Properties Company, St. Paul, Minn.

[21] Appl. No.: 08/631,073

[22] Filed: Apr. 12, 1996

[51] Int. Cl.$^6$ .................................. G02B 5/04; B32B 3/30
[52] U.S. Cl. ........................ 428/156; 428/141; 428/156; 428/913; 428/179; 428/167; 428/163; 359/530; 359/831; 359/834; 359/833; 359/837; 362/337; 362/339; 362/26; 385/146; 385/901; 385/36
[58] Field of Search .................................. 428/141, 156, 428/913, 179, 167, 163; 359/530, 831, 834, 833, 837; 362/337, 339, 26; 385/146, 901, 36

[56] References Cited

U.S. PATENT DOCUMENTS

| | | | |
|---|---|---|---|
| 1,969,982 | 8/1934 | Lehman | 362/337 |
| 1,986,065 | 1/1935 | Maillet | 362/339 |
| 3,541,606 | 11/1970 | Heenan et al. | 359/530 |
| 3,622,231 | 11/1971 | Hansen | 362/337 |
| 3,873,184 | 3/1975 | Heenan | 350/97 |
| 4,497,860 | 2/1985 | Brady, Jr. | 428/156 |
| 4,775,219 | 10/1988 | Appledorn et al. | 350/103 |
| 4,799,137 | 1/1989 | Aho | 362/309 |
| 4,823,246 | 4/1989 | Dilouya | 362/339 |
| 4,874,228 | 10/1989 | Aho et al. | 350/345 |
| 4,906,070 | 3/1990 | Cobb, Jr. | 350/286 |
| 4,938,563 | 7/1990 | Nelson et al. | 350/103 |
| 5,040,883 | 8/1991 | Cobb, Jr. | 350/452 |
| 5,056,892 | 10/1991 | Cobb, Jr. | 359/831 |
| 5,175,030 | 12/1992 | Lu et al. | 428/30 |
| 5,183,597 | 2/1993 | Lu | 264/1.4 |
| 5,189,553 | 2/1993 | Smith | 359/530 |
| 5,206,746 | 4/1993 | Ooi et al. | 359/40 |
| 5,237,641 | 8/1993 | Jacobson et al. | 385/146 |
| 5,245,454 | 9/1993 | Blondev | 359/70 |
| 5,303,322 | 4/1994 | Winston et al. | 385/146 |
| 5,349,503 | 9/1994 | Blondev | 359/530 |
| 5,363,470 | 11/1994 | Wortman | 385/147 |
| 5,467,208 | 11/1995 | Kokawa et al. | 359/49 |
| 5,471,348 | 11/1995 | Miller et al. | 359/837 |
| 5,506,929 | 4/1996 | Tai et al. | 385/146 |
| 5,585,164 | 12/1996 | Smith et al. | 428/156 |

FOREIGN PATENT DOCUMENTS

| | | |
|---|---|---|
| 573 268 A2 | 12/1983 | European Pat. Off. . |
| 44 11 206 A1 | 10/1995 | Germany . |
| 6-82635 | 3/1994 | Japan . |
| 8-313710 | 11/1996 | Japan . |
| 664 817 A5 | 3/1988 | Switzerland . |
| 95/35515 | 12/1995 | WIPO . |
| 96/27757 | 9/1996 | WIPO . |

OTHER PUBLICATIONS

Olof Bryngdahl, "Moiré: Formation and Interpretation", *Optica Acta*, 24 (1), 70–77 (1977).

*Primary Examiner*—William P. Watkins, III
*Attorney, Agent, or Firm*—Stephen W. Buckingham

[57] ABSTRACT

The present invention includes a structured optical film with variable pitch peaks and/or grooves to reduce the visibility of moiré interference patterns and optical displays incorporating one or more layers of the film. The pitch variations can be over groups of adjacent peaks and/or valleys or between adjacent pairs of peaks and/or valleys.

35 Claims, 4 Drawing Sheets

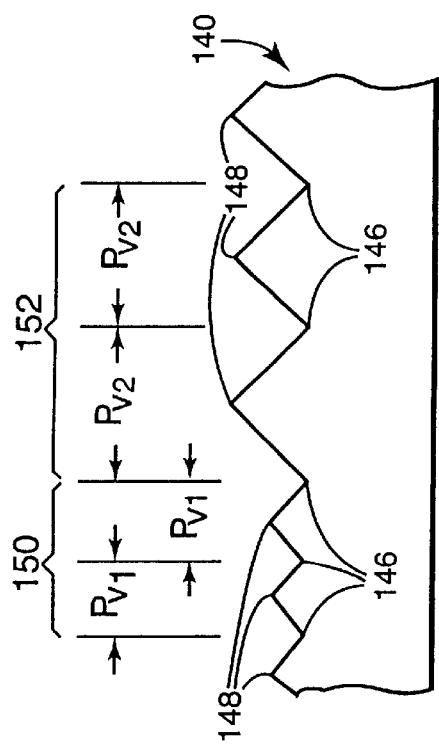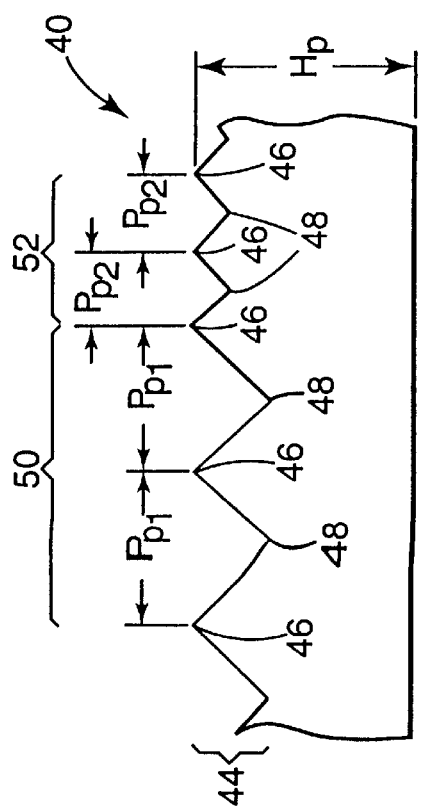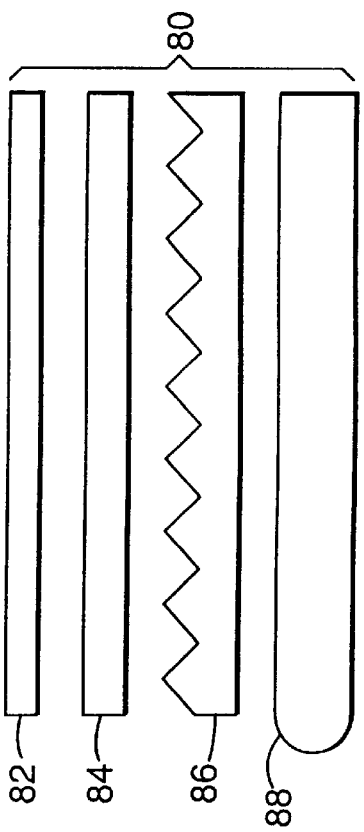
Fig. 4B
Fig. 6
Fig. 4A

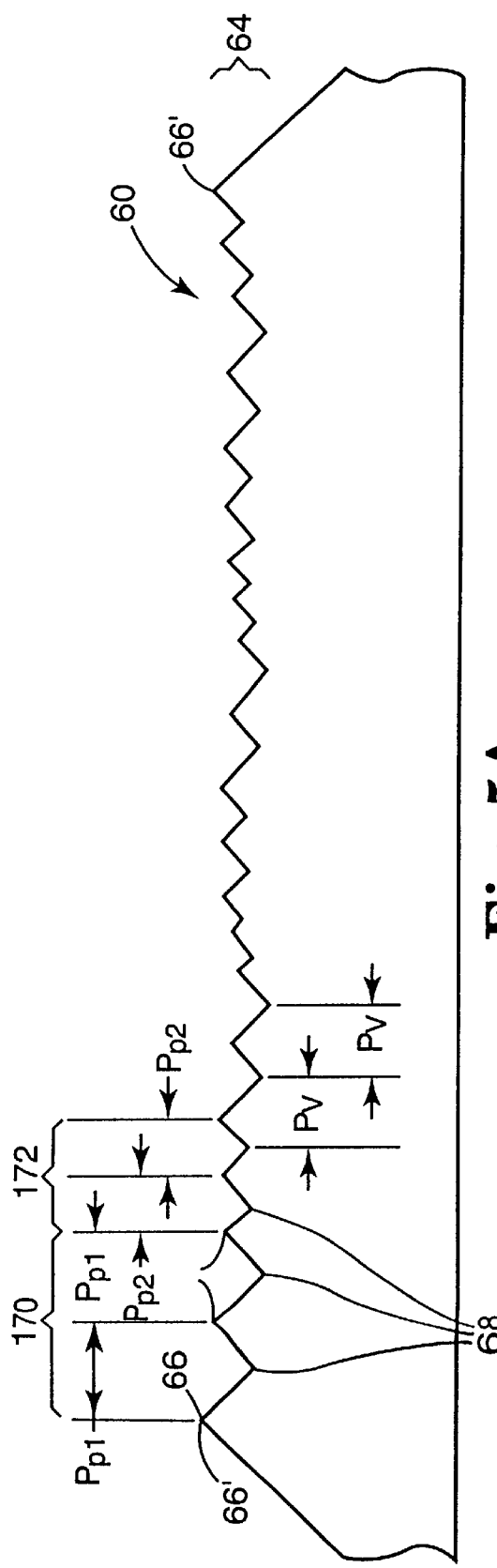
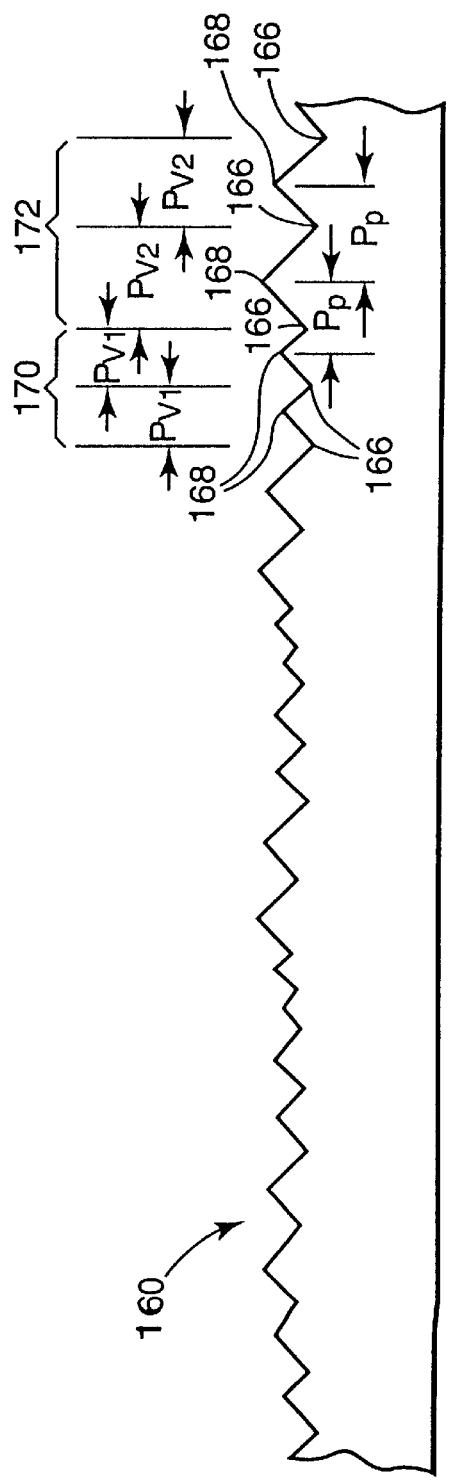
Fig. 5A
Fig. 5B

VARIABLE PITCH STRUCTURED OPTICAL FILM

FIELD OF THE INVENTION

The present invention relates to the field of structured optical films and optical displays incorporating the structured optical films. More particularly, the present invention relates to optical films having a structured surface in which the pitch of the valleys and/or peaks vary.

BACKGROUND OF THE INVENTION

Structured optical films are used in optical display systems and in other applications where control over the direction of light, transmitted and/or reflected, is desired to increase brightness, reduce glare, etc. Structured optical films are described generally in U.S. Pat. No. 4,906,070 (Cobb). Essentially, they comprise films of light transmissible materials in which a series of prisms are located such that the films can be used to redirect light through reflection and refraction. When used in an optical display such as that found in laptop computers, watches, etc., the structured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the structured film at an angle that allows it to escape from the display. That recycling is useful because it can reduce power consumption needed to provide a display with a desired level of brightness.

An undesirable effect of using a structured optical film in an optical display is the appearance of reflected moiré caused by the interference of two periodic patterns. Moiré effects are discussed in O. Bryngdahl, "Moiré: Formation and Interpretation," *Optica Acta*, Vol. 24(1), pp. 1–13 (1977). In an optical display incorporating a single layer of structured optical film, the periodic patterns causing moiré are the pattern in the film itself and the reflected image of the film pattern (as reflected by other surfaces in the optical display).

Some optical displays incorporate a second structured optical film in which the prisms are oriented at an angle with the prisms in the first optical film. That angle can be anywhere from greater than zero to 90°, although it is typically about 90°. Although using two structured optical films can increase the brightness of the display within a narrowed viewing range, it can increase the effects of moiré by providing a second plano surface (on the lower structured film) that reflects more light back through the periodic pattern in the first, or upper, structured film.

In addition, the second structured optical film may also lead to optical coupling that may result in uneven light transmission from the display, i.e., visible bright spots, streaks, and/or lines in the display. Optical coupling is caused by contacting, or very nearly contacting, a plano surface with the structured surface of a structured optical film.

SUMMARY OF THE INVENTION

The present invention includes a structured optical film with variable pitch peaks and/or grooves to reduce the visibility of moiré interference patterns and optical displays incorporating one or more layers of the film.

In one embodiment, the present invention includes a structured optical film having a structured surface that includes a plurality of generally parallel peaks, each pair of adjacent peaks being separated by a valley; a first group of adjacent peaks having a first peak pitch; and a second group of adjacent peaks having a second peak pitch, the second group of adjacent peaks being located adjacent to the first group of adjacent peaks, wherein the first peak pitch is different than the second peak pitch. The first group preferably includes 20 or fewer adjacent peaks, more preferably 10 or fewer and even more preferably 3 or fewer peaks. Alternatively, the first group can be defined in terms of width, with one preferred width being about 0.5 millimeters or less, more preferably about 200 micrometers or less. It is also preferable that the valley pitch within the first group varies over any three adjacent valleys.

In another embodiment, the present invention includes a structured optical film having a structured surface that includes a plurality of generally parallel valleys, each pair of adjacent valleys being separated by a peak; a first group of adjacent valleys having a first valley pitch; and a second group of adjacent valleys having a second valley pitch, the second group of adjacent valleys being located adjacent to the first group of adjacent valleys, wherein the first valley pitch is different than the second valley pitch. The first group preferably includes 20 or fewer adjacent valleys, more preferably 10 or fewer, and even more preferably 3 or fewer valleys. Alternatively, the first group can be defined in terms of width, with one preferred width being about 0.5 millimeters or less, more preferably about 200 micrometers or less. It is also preferable that the peak pitch within the first group varies over any three adjacent peaks.

In yet another embodiment, the present invention includes a structured optical film having a structured surface, wherein the structured surface comprises a plurality of generally parallel valleys, each pair of adjacent valleys being separated by a peak, wherein the peak pitch is substantially constant, and further wherein the valley pitch varies within a group of three or more successive adjacent valleys.

In still another embodiment, the present invention includes a structured optical film having a structured surface, wherein the structured surface comprises a plurality of generally parallel peaks, each pair of adjacent peaks being separated by a valley, wherein the valley pitch is substantially constant, and further wherein the peak pitch varies within a group of three or more successive adjacent peaks.

The above and other features of the invention are more fully shown and described in the drawings and detailed description of this invention, where like reference numerals are used to represent similar parts. It is to be understood, however, that the description and drawings (which are not to scale) are for the purposes of illustration only and should not be read in a manner that would unduly limit the scope of this invention.

BRIEF DESCRIPTION OF THE DRAWINGS

FIG. 4A is a schematic diagram of one section of an alternative structured film according to the present invention with a varying peak pitch.

FIG. 4B is a schematic diagram of one section of an alternative structured film according to the present invention with a varying valley pitch.

FIG. 5A is a schematic diagram of one section of an alternative structured film according to the present invention with a varying peak pitch and a varying valley pitch.

FIG. 5B is a schematic diagram of one section of an alternative structured film according to the present invention with a varying peak pitch and a varying valley pitch.

FIG. 6 is a schematic diagram of an optical display assembly incorporating at least one layer of structured optical film according to the present invention.

DETAILED DESCRIPTION OF THE INVENTION

The present invention, described in connection with the illustrative embodiments depicted in FIG. 3A and the following figures, provides a structured optical film in which the peak pitch and/or valley pitch vary to reduce the visibility of the moiré interference patterns when using one or more layers of the structured films in, for example, an optical display.

Figure 1:
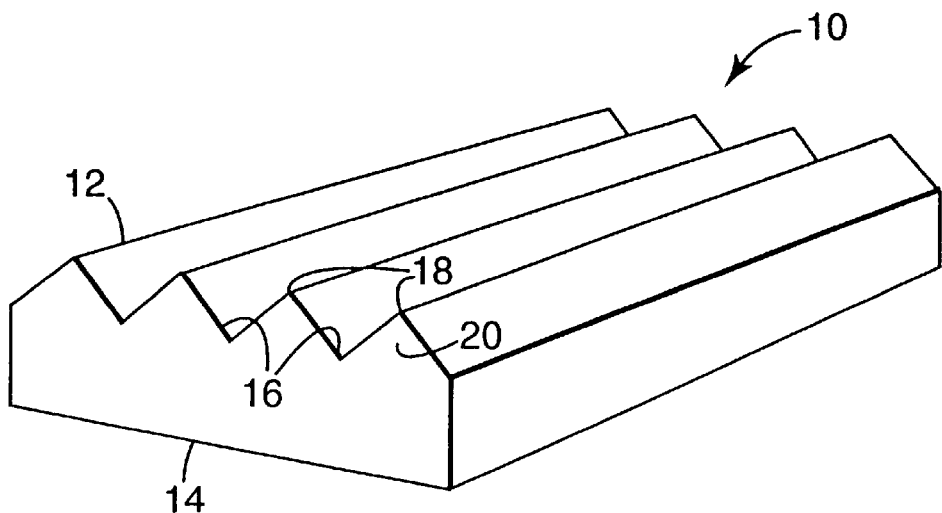
FIG. 1 is a perspective view of a prior art structured optical film.
Figure 2:
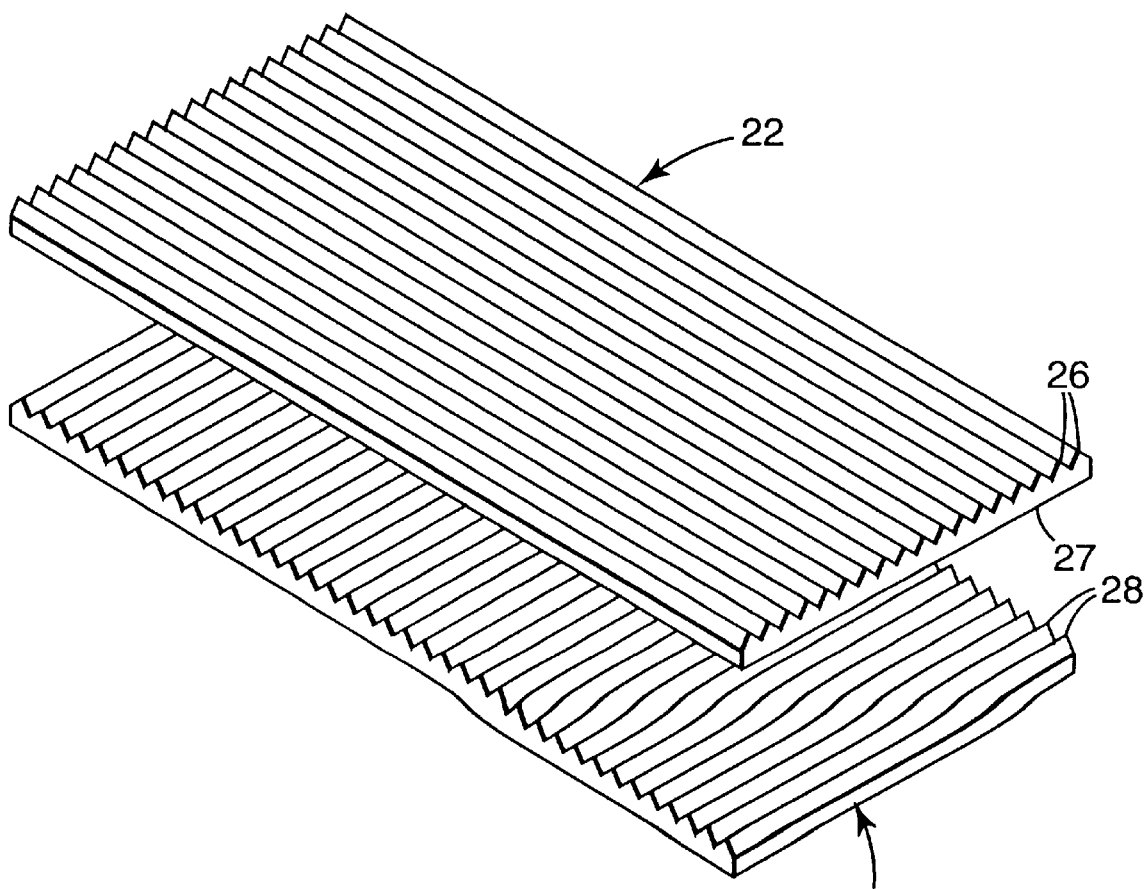
FIG. 2 is a perspective view is an exploded perspective view of a pair of structured films according to FIG. 1 in which the prisms are crossed at an angle of about 90°.

FIGS. 1 and 2 generally illustrate the concept of structured optical films. FIG. 1 depicts a section of a regular, periodic structured optical film 10 including a structured surface 12 and a plano surface 14. The structured surface includes a series of regularly spaced valleys 16 and peaks 18 that define prisms 20. The prisms 20 are defined by facets formed between the valleys 16 and peaks 18. The geometry of the structured surface 12 and the material used to manufacture the film 10 foster total internal reflection and refraction of light entering the plano side 14 of film 10 to minimize the escape of light through the structured surface outside of the desired range of angles.

FIG. 2 illustrates a pair of structured optical films 22 and 24 in which the prisms 26 and 28, respectively, are oriented at approximately 90° angle with respect to each other. In use, it is preferred that the structured surface 28 be in contact with, or nearly in contact with, the plano surface 27 of the upper film 22.

Although the prisms/facets generally depicted in connection with the present invention are shown as having a dihedral angle of about 90° between generally planar facets, it will be understood that the present invention includes structured optical films having prisms/facets formed in any optically useful shape, including lenticular arrays, prisms with rounded peaks and/or valleys, curved facets, etc. In other words, the present invention is useful with any structured optical film displaying a periodic pattern that could result in visible moiré interference patterns in the absence of variations in pitch as described herein. Furthermore, although the embodiments discussed below include a plano surface, it will be understood that the opposing surface of the structured optical films manufactured according to the present invention, i.e., the surface opposite the structured surface, could be substantially planar or it could be provided with a structure, texture, as a smooth surface, or with any other finish as desired.

Figure 3A:
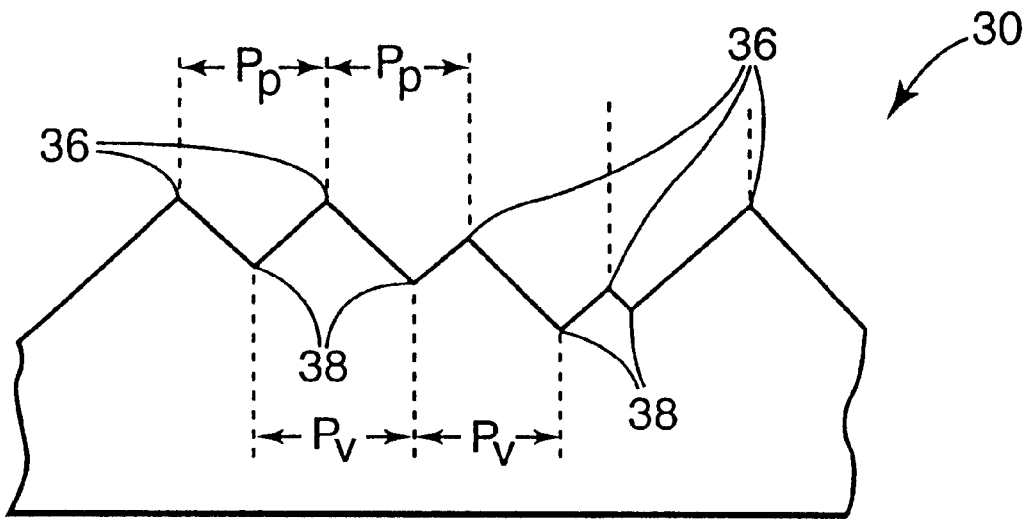
FIG. 3A is a schematic diagram of one section of a structured film according to the present invention with a constant peak pitch and a varying valley pitch.

It should also be understood that the embodiments depicted in FIGS. 3A and following are generally planar cross-sections of structured optical films constructed according to the present invention taken generally perpendicular to the length of the grooves/valleys. Given the variable nature of the optical films according to the present invention (to reduce the visibility of moiré interference patterns), it will be understood that the cross-sections of a given film may or may not remain constant along the length of the grooves/valleys. This may be particularly true in the structured optical films manufactured according to the present invention using tooling constructed by thread cutting a cylindrical roll.

FIG. 3A schematically depicts a cross-section, normal to the plano surface 32, of one structured optical film 30 according to the present invention. The film 30 includes a set of prisms defined by peaks 36 and valleys 38. The peaks 36 and valleys 38 defining the prisms are preferably substantially parallel to each other although slight variations would be acceptable. The spacing between adjacent peaks 36, i.e., the peak pitch, of the optical film 30 is substantially constant. The spacing between adjacent valleys 38, however, varies over any group of three successive valleys 38. That spacing between valleys 38 can also be referred to as valley pitch, Pv. By varying the valley pitch, the visibility of moiré interference patterns can be reduced when using film 30 in an optical display.

The peak pitch in a film 30 manufactured according to the present invention will preferably be about 1 millimeter or less, more preferably the peak pitch will be about 100 micrometers or less when the structured film 30 is used in optical displays incorporating liquid crystal display panels and similar devices. More preferably, the peak pitch for those applications will lie within about 20 to about 60 micrometers.

An optical film 30 can be produced using a tool manufactured by any known method. If the tool used to produce the film 30 is a roll, it can be manufactured by thread cutting at a constant thread pitch, plunge cutting using a constant spacing between grooves, or any other useful method. It is preferred to form each groove in the tool to a constant, but differing, depth when forming the tool used to manufacture the film 30.

If the tool used to form the film 30 is a cylindrical roll formed using thread cutting, it is preferred to constantly vary the depth of the groove formed in the roll by a cutting tool. That variation could include varying the depth of the groove at a constant or changing rate between a minimum and maximum, although it may also be helpful to have interim targeted depths between the minimum and maximums that are interspersed about the circumference of the roll to avoid adding periodicity into the grooves and, thus, the film.

When thread cutting, it may also be desirable to vary the number of revolutions, or "wraps," over which the cutting tool is moved between different targeted groove depths and, also, to use a number of roll revolutions between targeted depths that is not an integer. Even more preferably, it is desirable to use a number of revolutions including a fractional portion that is not easily multiplied to equal an integer. Examples of useful numbers of revolutions over which groove depth would be varied include, for example, 0.85, 1.15, 1.3, or 2.15. The targeted depth of the groove would then vary between the starting and ending point of each desired number of revolutions of the roll.

After the tool is manufactured, the film 30 can be manufactured using the tool according to any suitable method. Examples of methods and materials for forming structured optical films are discussed in U.S. Pat. Nos. 5,175,030 (Lu et al.) and 5,183,597 (Lu). It will be understood that the chosen manufacturing process is at least somewhat dependent on the material used for the films.

Figure 3B:
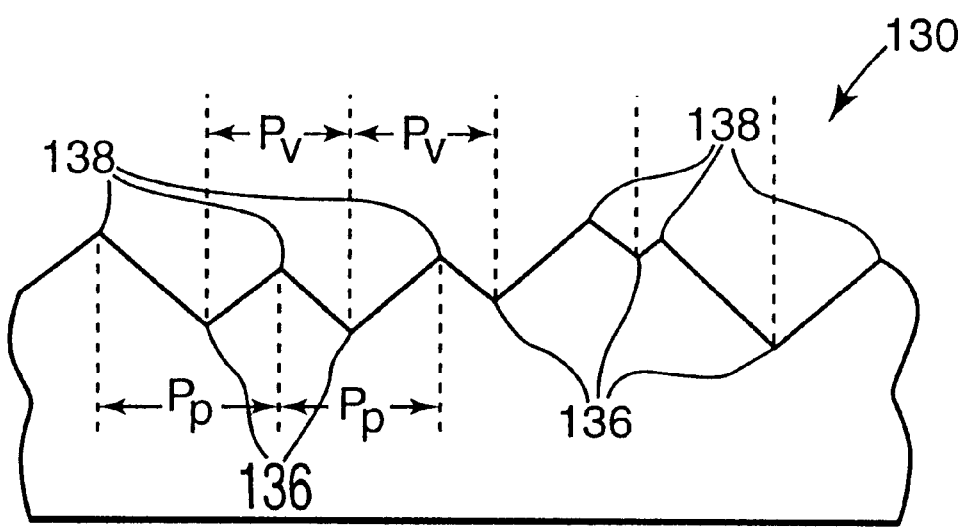
FIG. 3B is a schematic diagram of one section of a structured film according to the present invention with a constant valley pitch and a varying peak pitch.

In the film 30 depicted in FIG. 3A, peak pitch is held constant while the valley pitch varies. The tooling used to manufacture the film 30 can, however, be replicated by electroforming or other suitable processes, thus forming a "negative" of the pattern formed on the master tool. When that replicated tool is then used to form a film, the result, depicted in FIG. 3B, is a film 130 that is a "negative" of the film 30 depicted in FIG. 3A. As a result, film 130 has a constant valley pitch, Pv, between valleys 136 while the peak pitch, Pp, between peaks 138 varies across the film 130. That is exactly the opposite of the pitch characteristics of the film 30. Like film 30, the film 130 in FIG. 3B is also useful for reducing the visibility of moiré interference patterns when used in an optical display.

The valley pitch in a film 130 manufactured according to the present invention will preferably be about 1 millimeter or less, more preferably the valley pitch will be about 100 micrometers or less when the structured film 30 is used in optical displays incorporating liquid crystal display panels and similar devices. More preferably, the valley pitch for those applications will lie within about 20 to about 60 micrometers.

FIG. 4A is a schematic diagram of an alternative structured optical film 40 that includes a plano surface 42 and structured surface 44. Structured surface 44 includes a plurality of generally parallel prisms defined by peaks 46 and valleys 48. The peaks 46 are all preferably formed with substantially the same height, Hp, above the plano side 42 of the film.

In the film 40, the peak pitch, $Pp_1$, remains constant over a first group 50 of peaks 46. A second group 52 of peaks 46 is located immediately adjacent to the first group 50. The second group 52 of peaks 46 has a constant peak pitch, $Pp_2$, that is different from the peak pitch of the first group 50. It is the variation in peak pitch that contributes to reducing the visibility of moiré interference patterns when using film 40.

The peak pitch in a film 40 manufactured according to the present invention will preferably be about 1 millimeter or less, more preferably the peak pitch will be about 100 micrometers or less when the structured film 140 is used in optical displays incorporating liquid crystal display panels and similar devices. More preferably, the peak pitch for those applications will lie within about 20 to about 60 micrometers. Typical peak pitches used in connection with the present invention include groups of peaks spaced at 50, 40, 30 and 20 micrometers. It may be helpful to provide maximum peak pitch to minimum peak pitch ratios of about 1.25 or greater, more preferably about 1.5 or greater and even more preferably about 2.0 or greater to reduce the visibility of moiré interference patterns.

The number of peaks 46 in each of the groups can be varied to improve moiré interference reduction. The film 40 includes groups 50 and 52 in which groups of three adjacent peaks 46 have a constant peak pitch. In some structured films according to the present invention, it may be helpful where at least one of the groups has about 20 or fewer peaks; preferably about 10 or fewer; more preferably about 5 or fewer; and even more preferably about 3 or fewer peaks. In some structured films, it may also be helpful to include only two adjacent peaks 46 in a group, i.e., provide a pattern in which the peak pitch varies between successive pairs of peaks.

Although the film 40 includes only two groups 50 and 52, it will be understood that the present invention includes films having at least two or more groups of peaks, i.e., the film 40 could include any number of groups, not just two groups. Also, although the film 40 is shown as having two groups with equal numbers of peaks 46, it will be understood that each group may include the same or different number of peaks 46.

An alternative measure of the group size can be based on the width of the groups as measured generally perpendicular to the peaks and valleys. Preferably, the width of each group is about 1 millimeter or less, more preferably about 0.5 millimeters or less, more preferably about 200 micrometers, more preferably about 100 micrometers or less, and even more preferably about 50 micrometers or less. It will be understood that, in part, the desired group widths are based on the pitch of the peaks and valleys in the film 40.

An optical film 40 can be produced using a tool manufactured by any suitable method. It will be understood that the height of the peaks, Hp, in the finished film 40 is a function of the depth of the grooves cut into the tool. If the tool used to produce the film 40 is a cylindrical roll, it can be manufactured by thread cutting the roll to a constant depth at a constant thread pitch over the grooves used to form each group of peaks having a constant peak pitch. If thread cutting is used to form a roll, it is desirable to hold the thread pitch constant for a number of roll revolutions that is not an integer. Even more preferably, it is desirable to hold the thread pitch constant for a fractional number that is not easily multiplied to equal an integer. Example of useful numbers of revolutions over which thread pitch could be held constant include, for example, 0.85, 1.15, 1.3, or 2.15. It will be understood that the integer portion of the number of revolutions over which thread pitch is held constant determines the number of peaks in each of the groups.

After the tool is manufactured, the film 40 can be manufactured using the tool according to any suitable method. Examples of methods and materials for forming structured optical films are discussed in U.S. Pat. Nos. 5,175,030 (Lu et al.) and 5,183,597 (Lu). It will be understood that the chosen manufacturing process is at least somewhat dependent on the material used for the films.

The tooling used to manufacture the film 40 can be replicated by electroforming or other suitable processes, thus forming a "negative" of the pattern formed on the master tool. When that replicated tool is then used to form a film, the result, depicted in FIG. 4B, is a film 140 that is a "negative" of the film 40 depicted in FIG. 4A. As a result, the valley pitch, Pv, in film 140 remains constant over a first group 150 of valleys 146. A second group 152 of valleys 146 is located immediately adjacent to the first group 150. The second group 152 of valleys 146 has a constant valley pitch, $Pv_2$, that is different from the valley pitch of the first group 150. It is the variation in valley pitch that contributes to reducing the visibility of moiré interference patterns when using film 140.

The valley pitch in a film 140 manufactured according to the present invention will preferably be about 1 millimeter or less, more preferably the valley pitch will be about 100 micrometers or less when the structured film 140 is used in optical displays incorporating liquid crystal display panels and similar devices. More preferably, the valley pitch for those applications will lie within about 20 to about 60 micrometers. Typical valley pitches used in connection with the present invention include groups of peaks spaced at 50, 40, 30 and 20 micrometers. It may be helpful to provide maximum valley pitch to minimum valley pitch ratios of about 1.25 or greater, more preferably about 1.5 or greater and even more preferably about 2.0 or greater to reduce the visibility of moiré interference patterns.

The number of valleys 146 in each of the groups can be varied to reduce the visibility of moiré interference patterns. The film 140 includes groups 150 and 152 in which groups of three adjacent valleys 146 have a constant valley pitch. In some structured films according to the present invention, it may be helpful where at least one of the groups has about 20 or fewer valleys; preferably about 10 or fewer; more preferably about 5 or fewer; and even more preferably about 3 or fewer valleys. In some structured films, it may also be helpful to include only two adjacent valleys 146 in a group, i.e., provide a pattern in which the valley pitch varies between successive pairs of valleys.

Although the film 140 includes only two groups 150 and 152, it will be understood that the present invention includes films having at least two or more groups of evenly-spaced valleys, i.e., the film 140 could include any number of groups, not just two groups. Also, although the film 140 is shown as having two groups with equal numbers of evenly-spaced valleys 146, it will be understood that each group may include the same or different number of valleys 146.

An alternative measure of the group size can be based on the width of the groups as measured generally perpendicular to the peaks and valleys. Preferably, the width of each group is about 1 millimeter or less, more preferably about 0.5 millimeters or less, more preferably about 200 micrometers, more preferably about 100 micrometers or less, and even more preferably about 50 micrometers or less. It will be understood that, in part, the desired group widths are based on the pitch of the peaks and valleys in the film 140.

After the replicated tool is manufactured, the film 140 can be manufactured according to any suitable method. Examples of methods and materials for forming structured optical films are discussed in U.S. Pat. Nos. 5,175,030 (Lu et al.) and 5,183,597 (Lu). It will be understood that the chosen manufacturing process is at least somewhat dependent on the material used for the films.

Turning now to FIG. 5A, a cross-section of another alternative structured optical film 60 according to the present invention is shown in a schematic diagram as including a plano surface 62 and a structured surface 64. Structured surface 64 includes a plurality of generally parallel prisms defined by peaks 66 and valleys 68.

Structured film 60 includes groups of peaks 66 with constant peak pitch. The peak pitch, $Pp_1$, remains constant over a first group 70 of peaks 66. A second group 72 of peaks 66 is located immediately adjacent to the first group 70. The second group 72 of peaks 66 has a constant peak pitch, $PP_2$, that is different from the peak pitch of the first group 70.

The number of peaks 66 in each of the groups can be varied to reduce the visibility of moiré interference patterns caused by the film 60. The film 60 includes groups 70 and 72 in which groups of three adjacent peaks 66 have a constant peak pitch. In some structured films according to the present invention, it may be helpful where at least one of the groups has about 20 or fewer peaks; preferably about 10 or fewer; more preferably about 5 or fewer; and even more preferably about 3 or fewer peaks. In some structured films, it may also be helpful to include only two adjacent peaks 66 in a group, i.e., provide a pattern in which the peak pitch varies between successive pairs of peaks.

An alternative measure of the group size in film 60 can be based on the width of the groups as measured generally perpendicular to the peaks and valleys. Preferably, the width of each group for many applications is about 1 millimeter or less, more preferably about 0.5 millimeters or less, more preferably about 200 micrometers, more preferably about 100 micrometers or less, and even more preferably about 50 micrometers or less. It will be understood that, in part, the desired group widths are based on the pitch of the peaks and valleys in the structured film 60.

Although the film 60 is depicted with only two groups 70 and 72, it will be understood that the present invention includes films having at least two or more groups of peaks, i.e., the film could include any number of groups, not just two groups. Also, although the film 70 is shown as having two groups with equal numbers of peaks 66, it will be understood that each group may include the same or different number of peaks 66.

An optical film 60 can be produced using a tool manufactured by any known method. It will be understood that the height of the peaks in the finished film is a function of the depth of the grooves cut into the tool. If the tool used to produce the film 60 is a cylindrical roll, it can be manufactured by thread cutting the roll at a constant thread pitch over the grooves used to form each group of peaks having a constant peak pitch, i.e., the number of revolutions at any given thread pitch will define the number of grooves formed at that thread pitch (which also corresponds to the number of peaks with the given peak pitch).

If thread cutting is used to form a roll, it is desirable to hold the thread pitch constant for a number of roll revolutions that is not an integer. Even more preferably, it is desirable to hold the thread pitch constant for a fractional number that is not easily multiplied to equal an integer. Examples of useful numbers of revolutions over which thread pitch could be held constant include, for example, 0.85, 1.15, 1.3, or 2.15. It will be understood that the integer portion of the number of revolutions over which thread pitch is held constant determines the number of peaks in each of the groups.

While thread pitch (and, therefore, peak pitch) are varied as discussed above, the depth of the grooves on the tool used to manufacture the film 60 can also be varied to change the valley pitch as well. If the tool is formed by thread cutting, it is preferred to constantly vary the depth of the groove formed in the cylindrical roll. That variation could include varying the depth at a constant or changing rate between a minimum and maximum, although it may also be helpful to have interim targeted depths between the minimum and maximums that are interspersed about the circumference of the roll to avoid adding periodicity to the grooves and, thus, the film 60 formed using the tool.

It may also be desirable to vary the number of revolutions it takes to move between different targeted groove depths and, also, to use a number of roll revolutions between targeted depths that is not an integer. Even more preferably, it is desirable to use a number of revolutions including a fractional portion that is not easily multiplied to equal an integer. Examples of useful numbers of revolutions over which groove depth would be varied include, for example, 0.85, 1.15, 1.3, or 2.15. The targeted depth of the groove would then vary between the starting and ending point of each desired number of revolutions of the roll.

The changes between targeted cutting tool depths, i.e., groove depths, may correspond to the changes in thread pitch about the roll, or alternatively, the changes in targeted tool depths may be independent of the changes in thread pitch. In other words, the number of revolutions over which groove depth changes can be the same as or different than the number of revolutions over which the thread pitch remains constant within a group.

After the tool is manufactured, the film 60 can be manufactured using the tool according to any suitable method. Examples of methods and materials for forming structured optical films are discussed in U.S. Pat. Nos. 5,175,030 (Lu et al.) and 5,183,597 (Lu). It will be understood that the chosen manufacturing process is at least somewhat dependent on the material used for the films.

The peak pitch in a film 60 manufactured according to the present invention will preferably be about 1 millimeter or less, more preferably the peak pitch will be about 100 micrometers or less when the structured film 60 is used in optical displays incorporating liquid crystal display panels and similar devices. More preferably, the peak pitch for those applications will lie within about 20 to about 60 micrometers. Typical peak pitches used in connection with the present invention include groups of peaks spaced at 50, 40, 30 and 20 micrometers. It may be helpful to provide maximum peak pitch to minimum peak pitch ratios of about 1.25 or greater, more preferably about 1.5 or greater and even more preferably about 2.0 or greater to reduce the visibility of moiré interference patterns.

In addition to varying pitch (peak and valley) any of the structured optical films manufactured according to the present invention may also include structures in the film 60 that prevent or reduce optical coupling. The film 60 is depicted as including taller peaks 66' at each end of the depicted array that can provide the desired spacing between film 60 and a smooth or plano surface (not shown) above the film 60 to prevent, or at least reduce, optical coupling as described in commonly-assigned, copending U.S. patent application Ser. No. 08/400,052, titled LIGHT DIRECTING FILM HAVING VARIABLE HEIGHT STRUCTURED SURFACE AND LIGHT DIRECTING ARTICLE CONSTRUCTED THEREFROM, filed on Mar. 3, 1995 now abandoned. One preferred spacing, or pitch, between the peaks 66' is about 709 micrometers, although any desired spacing could be provided.

The tooling used to manufacture the film 60 can be replicated by electroforming or other suitable processes, thus forming a "negative" of the pattern formed on the master tool. When that replicated tool is then used to form a film, the result, depicted in FIG. 5B, is a film 160 that is a "negative" of the film 60 depicted in FIG. 5A. As a result, structured film 160 includes groups of valleys 166 with constant valley pitch. The valley pitch, $Pv_1$, remains constant over a first group 170 of valleys 166. A second group 172 of valleys 166 is located immediately adjacent to the first group 170. The second group 172 of valleys 166 has a constant valley pitch, $Pv_2$, that is different from the valley pitch of the first group 170.

The number of valleys 166 in each of the groups can be varied to reduce the visibility of moiré interference patterns caused by the film 160. The film 160 includes groups 170 and 172 in which groups of three adjacent valleys 166 have a constant valley pitch. In some structured films according to the present invention, it may be helpful where at least one of the groups has about 20 or fewer valleys; preferably about 10 or fewer; more preferably about 5 or fewer; and even more preferably about 3 or fewer valleys. In some structured films, it may also be helpful to include only two adjacent valleys 166 in a group, i.e., provide a pattern in which the valley pitch varies between successive pairs of valleys.

Although the film 160 is depicted with only two groups 170 and 172, it will be understood that the present invention includes films having at least two or more groups of evenly-spaced valleys, i.e., the film could include any number of groups, not just two groups. Also, although the film 170 is shown as having two groups with equal numbers of evenly-spaced valleys 166, it will be understood that each group may include the same or different number of valleys 166.

An alternative measure of the group size in film 160 can be based on the width of the groups as measured generally perpendicular to the peaks and valleys. Preferably, the width of each group is about 1 millimeter or less, more preferably about 0.5 millimeters or less, more preferably about 200 micrometers, more preferably about 100 micrometers or less, and even more preferably about 50 micrometers or less. It will be understood that, in part, the desired group widths are based on the pitch of the peaks and valleys in the structured film 160.

The valley pitch used in a film 160 manufactured according to the present invention will preferably be about 1 millimeter or less, more preferably the valley pitch will be about 100 micrometers or less when the structured film 160 is used in optical displays incorporating liquid crystal display panels and similar devices. More preferably, the valley pitch for those applications will lie within about 20 to about 60 micrometers.

The film 160 can be manufactured from a replicated tool according to any suitable method. Examples of methods and materials for forming structured optical films are discussed in U.S. Pat. Nos. 5,175,030 (Lu et al.) and 5,183,597 (Lu). It will be understood that the chosen manufacturing process is at least somewhat dependent on the material used for the films.

As discussed with respect to FIG. 2, two structured optical films with varying pitch manufactured according to the present invention can be combined in a crossed relationship to reduce the visibility of moiré interference patterns. As an alternative, it may be helpful to use the structured films according to the present invention for the upper layer of such a paired construction, because it is the upper layer that is the most significant contributor to the visibility of moiré interference patterns. Where films according to the present invention are used for the upper film, the lower film could be any other suitable structured optical film useful for enhancing brightness of optical displays. Examples of suitable films for pairing with the structured optical film manufactured according to the present invention are available from Minnesota Mining and Manufacturing Company, St. Paul, Minn. (marketed under the tradename Brightness Enhancement Film).

FIG. 6 illustrates one application in which one or more layers of structured optical film manufactured according to the present invention can be advantageously used. The application is a backlit optical display assembly 80. The assembly 80 includes a display panel 82 and two crossed layers of structured optical films 84 and 86 manufactured according to the present invention. The optical display assembly 80 includes a backlight assembly 88 for use in those situations in which ambient light is insufficient to view the display panel 84. Although two structured optical films are depicted in FIG. 6, it will be understood that an optical display could include only a single structured optical film manufactured according to the present invention.

Although the particular material used to manufacture structured optical films according to the present invention may vary, it is important that the material be substantially transparent to ensure high optical transmission. Useful polymeric materials for this purpose are commercially available such as, for example, acrylics, and polycarbonates having nominal indices of refraction of about 1.493 and 1.586, respectively. Other useful polymers include acrylate, polyester, polypropylene, polyurethane, polystyrene, polyvinyl chloride, and the like. While the particular material is not critical, materials having higher indices of refraction will generally be preferred. Useful materials for forming structured optical films are discussed in U.S. Pat. Nos. 5,175,030 (Lu et al.) and 5,183,597 (Lu).

Also, although methods of producing tooling useful for manufacturing structured optical films according to the present invention are described above, it will be understood that any method of producing tooling and/or manufacturing a structured optical film with varying peak and/or valley pitch could be substituted. In addition, although the focus of the above discussion has been on the use of cylindrical tools for manufacturing structured optical films according to the present invention, it should be understood that planar tooling could also be used to manufacture the films. Furthermore, although thread cutting of cylindrical rolls will not produce a film having exactly parallel prisms, the prisms will be generally parallel for the purposes of the present invention.

The following non-limiting examples illustrate the manufacture and features of two structured optical films according to the principles of the present invention.

EXAMPLE 1

A structured optical film according to the present invention was produced using a tool manufactured according to the following method. A cylindrical roll having a smooth surface was cut using a 90° cutting tool. The cutting tool was advanced along the axis of the roll at a constant rate of 32 micrometers for each full revolution. As the roll was rotated during cutting, the depth of the cutting tool was changed 16 micrometers over 0.85 revolutions to define a particular "cut" as defined herein. As a result, if the tool ended at a depth of 16 micrometers at the end of a cut, it was then moved out to depth of 0 micrometers at the end of the succeeding cut.

The film produced using the roll cut as discussed above exhibited a constant peak pitch and varying valley pitch as described with respect to FIG. 3 above.

When two layers of the film so produced were crossed 90°, a moiré interference pattern was visible, but at a reduced level as compared to two crossed structured optical films with a constant peak/valley pitch. The crossed layers exhibited a drop in gain of about 8.6% as compared to two crossed layers of Brightness Enhancement Film (BEF I—90° prisms with a 50 micrometers pitch) sold by Minnesota Mining and Manufacturing Company, St. Paul, Minn. Gain was measured using a backlight from Sharp Microelectronics Technology, Inc. (Camas, Wash.), Model C12P, and a luminance meter from Photo Research (California), Model PR650 SpectraColorimeter. The measurements were taken at a distance of about 406 mm (16 inches) above the films and centered over the films which were about 152 mm×203 mm (6 inches ×8 inches).

EXAMPLE 2

A structured optical film according to the present invention was produced using a tool manufactured according to the following method. A cylindrical roll having a smooth surface was cut using a 90° cutting tool. The cutting tool was advanced along the axis of the roll at a constant rate over 2.15 revolutions. The rate of advancement of the cutting tool was changed for each group of 2.15 revolutions. As the roll was rotated during cutting, the depth of the cutting tool was also changed from a starting depth to an ending depth for each 2.15 revolutions. To prevent discontinuities in the cutting depth, the ending depth of the tool after one group of 2.15 revolutions was the starting depth for the next group of 2.15 revolutions.

| Group | Groove Spacing ($10^{-6}$ meters) | Starting Depth ($10^{-6}$ meters) | Ending Depth ($10^{-6}$ meters) |
| --- | --- | --- | --- |
| 1 | 50 | 28 | 18 |
| 2 | 30 | 18 | 23 |
| 3 | 40 | 23 | 13 |
| 4 | 20 | 13 | 18 |
| 5 | 30 | 18 | 23 |
| 6 | 40 | 23 | 13 |
| 7 | 20 | 13 | 18 |
| 8 | 30 | 18 | 23 |
| 9 | 40 | 23 | 18 |
| 10 | 30 | 18 | 28 |

The above array of groups was repeated until a sufficiently wide roll was patterned to form a film. Desirably, the array included two tall peaks spaced at either end about 700 micrometers apart. These taller peaks provided the structure to reduce or prevent optical coupling.

When two layers of the film so produced were crossed, almost no moiré interference pattern was visible. The crossed layers exhibited a drop in gain of 6% as compared to two crossed layers of Brightness Enhancement Film (BEF I with 90° prisms spaced at 50 micrometers) sold by Minnesota Mining and Manufacturing Company, St. Paul, Minn. Gain was measured as described in connection with Example 1.

When a single layer of this film was crossed with a bottom layer of Brightness Enhancement Film II (90° prisms at a 50 micrometer pitch) (available from Minnesota Mining and Manufacturing Company, St. Paul, Minn.), an increased amount of moiré interference was observed as compared to two films manufactured according to the present invention. The brightness of that combination was improved, however, exhibiting a loss in gain of 4.2%.

Any patents, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A structured optical film having a structured surface, wherein the structured surface comprises:

a) a plurality of generally parallel peaks, each peak having a length and the length of each peak extending substantially uninterrupted across the structured surface, each pair of adjacent peaks being separated by a valley, wherein each of the plurality of peaks has the same dihedral angle;

b) a first group of three or more adjacent peaks having a first peak pitch; and c) a second group of adjacent peaks having a second peak pitch, the second group of adjacent peaks being located adjacent to the first group of adjacent peaks, wherein the first peak pitch is different than the second peak pitch.

2. A film according to claim 1, wherein the first group of adjacent peaks further comprises about 20 or fewer peaks.

3. A film according to claim 1, wherein the first group of adjacent peaks further comprises about 10 or fewer peaks.

4. A film according to claim 1, wherein the first group of adjacent peaks further comprises about 5 or fewer peaks.

5. A film according to claim 1, wherein the valley pitch within the first group of adjacent peaks varies.

6. A film according to claim 5, wherein the valley pitch over 3 or more adjacent valleys located within the first group of adjacent peaks varies.

7. A structured optical film having a structured surface, wherein the structured surface comprises:
   a) a plurality of generally parallel peaks, each peak having a length and the length of each peak extending substantially uninterrupted across the structured surface, each pair of adjacent peaks being separated by a valley, wherein each of the plurality of peaks has the same dihedral angle;
   b) a first group of three or more adjacent peaks having a first peak pitch; and
   c) a second group of three or more adjacent peaks having a second peak pitch, the second group of adjacent peaks being located adjacent to the first group of adjacent peaks, wherein the first peak pitch is different than the second peak pitch.

8. A film according to claim 7, wherein the first group of adjacent peaks further comprises about 5 or fewer peaks.

9. A film according to claim 1, wherein the width of the first group of adjacent peaks is about 1 millimeter or less.

10. A film according to claim 1, wherein the width of the first group of adjacent peaks is about 0.5 millimeters or less.

11. A film according to claim 1, wherein the width of the first group of adjacent peaks is about 200 micrometers or less.

12. A film according to claim 1, wherein the width of the first group of adjacent peaks is about 100 micrometers or less.

13. A film according to claim 1, wherein the width of the first group of adjacent peaks is about 50 micrometers or less.

14. A film according to claim 1, wherein the ratio of the first peak pitch to the second peak pitch is about 1.25 or greater.

15. A film according to claim 1, wherein the ratio of the first peak pitch to the second peak pitch is about 1.5 or greater.

16. A film according to claim 1, wherein the ratio of the first peak pitch to the second peak pitch is about 2.0 or greater.

17. A structured optical film having a structured optical surface, wherein the structured optical surface comprises:
   a) a plurality of prisms, each of the prisms comprising a peak having a length, a pair of adjacent valleys, and a dihedral angle defined by facets extending from the peak to the pair of adjacent valleys defining the prism, wherein each of the prisms extends substantially uninterrupted across the structured surface along the length of its peak and the dihedral angles of each of the prisms in the plurality of prisms are the same, and further wherein each pair of adjacent prisms are immediately adjacent each other;
   b) a first group of three or more adjacent prisms having a first peak pitch;
   c) a second group of adjacent prisms having a second peak pitch, the second group of adjacent prisms being located adjacent to the first group of adjacent prisms, wherein the first peak pitch is different than the second peak pitch.

18. A film according to claim 17, wherein the ratio of the first peak pitch to the second peak pitch is about 1.25 or greater.

19. A film according to claim 17, wherein the ratio of the first peak pitch to the second peak pitch is about 1.5 or greater.

20. A film according to claim 17, wherein the ratio of the first peak pitch to the second peak pitch is about 2.0 or greater.

21. A film according to claim 17, wherein the first group of adjacent prisms further comprises about 20 or fewer prisms.

22. A film according to claim 17, wherein the first group of adjacent prisms further comprises about 10 or fewer prisms.

23. A film according to claim 17, wherein the first group of adjacent prisms further comprises about 5 or fewer prisms.

24. An optical display assembly comprising:
   a) a display panel;
   b) a backlight assembly;
   c) a first structured optical film located between the backlight assembly and the display panel, the film having a structured optical surface facing the display panel, the structured optical surface comprising:
      1) a plurality of prisms, each of the prisms comprising a peak having a length, a pair of adjacent valleys, and a dihedral angle defined by facets extending from the peak to the pair of adjacent valleys defining the prisms, wherein each of the prisms extends substantially uninterrupted across the structured surface along the length of its peak and the dihedral angles of each of the prisms in the plurality of prisms are the same, and further wherein each pair of adjacent prisms are immediately adjacent each other;
      2) a first group of three or more adjacent peaks having a first peak pitch; and
      3) a second group of adjacent peaks having a second peak pitch, the second group of adjacent peaks being located adjacent to the first group of adjacent peaks, wherein the first peak pitch is different than the second peak pitch.

25. A display assembly according to claim 24, wherein the ratio of the first peak pitch to the second peak pitch is about 1.25 or greater.

26. A display assembly according to claim 24, wherein the ratio of the first peak pitch to the second peak pitch is about 1.5 or greater.

27. A display assembly according to claim 24, wherein the ratio of the first peak pitch to the second peak pitch is about 2.0 or greater.

28. A display assembly according to claim 24, wherein the first group of adjacent peaks further comprises about 10 or fewer peaks.

29. A display assembly according to claim 24, wherein the first group of adjacent peaks further comprises about 5 or fewer peaks.

30. A display assembly according to claim 24, wherein the second group of adjacent peaks comprises three or more peaks.

31. A display assembly according to claim 24, wherein the valley pitch within the first group of adjacent peaks varies.

32. A display assembly according to claim 24, wherein the valley pitch over 3 or more adjacent valleys located within the first group of adjacent peaks varies.

33. A display assembly according to claim 24, further comprising a second structured optical film located between the backlight assembly and the display panel, the second structured optical film having a structured optical surface comprising a plurality of prisms, wherein the prisms of the first and second structured optical films are crossed with respect to each other.

34. A display assembly according to claim 33, wherein the plurality of prisms on the second structured optical film comprise regularly spaced valleys and peaks.

35. A display assembly according to claim 34, wherein the second structured optical film is located between the first structured optical film and the backlight assembly.

* * * * *

UNITED STATES PATENT AND TRADEMARK OFFICE
CERTIFICATE OF CORRECTION

PATENT NO. : 5,919,551
DATED : July 6, 1999
INVENTOR(S) : Sanford Cobb, Jr., Mark E. Gardiner, Keith M. Kotchick, Kazuhiko Toyooka, William A. Hibbard It is certified that error appears in the above-identified patent and that said Letters Patent is hereby corrected as shown below:

Column 6,
Line 41, "Pv," should read -- $Pv_1$ --.

Signed and Sealed this

Twenty-sixth Day of March, 2002

Attest:

JAMES E. ROGAN
Attesting Officer    Director of the United States Patent and Trademark Office